Sept. 2, 1969   L. K. COLBY ET AL   3,465,181
ROTOR FOR FRACTIONAL HORSEPOWER TORQUE MOTOR
Filed June 8, 1966

INVENTORS.
LEO K. COLBY
BURTON F. KIRBY
BY
*B.E. Shlesinger*
ATTORNEY

United States Patent Office 3,465,181
Patented Sept. 2, 1969

3,465,181
ROTOR FOR FRACTIONAL HORSEPOWER
TORQUE MOTOR
Leo K. Colby and Burton F. Kirby, Rochester, N.Y., assignors to Fasco Industries, Inc., Rochester, N.Y., a corporation of New York
Filed June 8, 1966, Ser. No. 556,106
Int. Cl. H02k 15/12
U.S. Cl. 310—44                                   3 Claims

ABSTRACT OF THE DISCLOSURE

The rotor comprises a hollow, cylindrical, core sintered from a blend of magnetic and non-magnetic particles, and a pair of sintered copper end rings secured to opposite ends of the core coaxially thereof to conduct current in a sheet across opposite ends of the rotor, thereby to eliminate cogging. The quantity of magnetic particles in the core exceeds that of the non-magnetic particles. A sample core blend is 75% iron particles and 25% of copper particles. The peripheral surface of the core may also be coated with a layer of copper, as by sintering or plating.

---

This invention relates to electric torque motors, and more particularly to a novel rotor for use in fractional horsepower torque motors of the shaded pole type.

Motors of this type heretofore have had the disadvantage that only a limited number of conductor bars can be accommodated in the rotor, with the result that cogging is likely to occur when the conductors pass the stator poles during starting of the motor. Moreover, the rotors have to be relatively heavy to accommodate the bars, and as a result have only fair speed-torque characteristics and require a relatively large starting current and torque to overcome their inertia.

Our general objective is to provide a torque motor, which can be manufactured easily and economically, which will have a straight line speed-torque curve with a reasonable amount of starting torque, and wherein said starting torque will be free of cogging.

Another object is to provide a new and improved shaded pole type motor, which will obviate most of the disadvantages of prior, like motors.

A further object is to provide an improved shaded pole type motor that will operate as a torque motor having a straight line speed-torque curve.

A further object of this invention is to provide for motors of the type described, an improved rotor, which will substantially eliminate cogging of the motor during the starting thereof.

Another object of this invention is to provide an improved torque motor, which will produce a significant starting torque, and which can be totally enclosed, operated without a cooling fan, and still have a temperature rise at starting torque below the allowable temperature rise for this type of motor.

Still another object of this invention is to provide an improved rotor for a motor of the type described, which is substantially lighter than prior, such rotors.

A still further object of the invention is to provide a simplified dynamo-electric machine which operates on a straight line speed torque curve with a significant starting torque and which utilizes less starting current than prior squirrel cage torque motors.

Other objects of the invention will be apparent hereinafter from the specification and from the recital of the appended claims, particularly when read in conjunction with the accompanying drawing.

Figure 1:
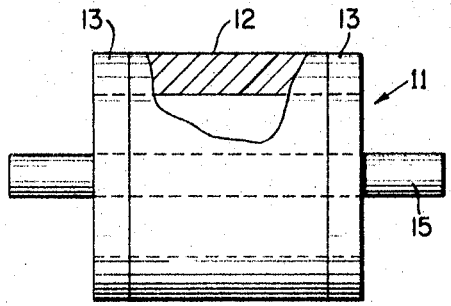
Figure 2:
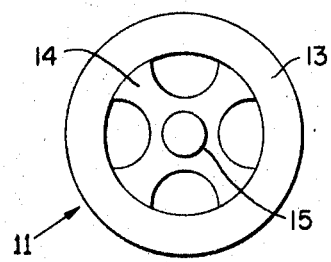
Figure 3:
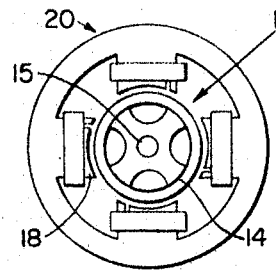
Figure 4:
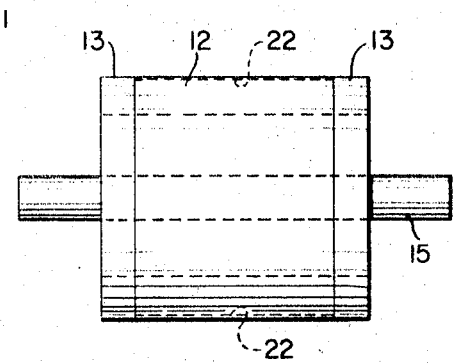
Figure 5:
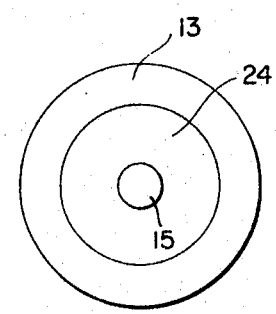
Figure 6:
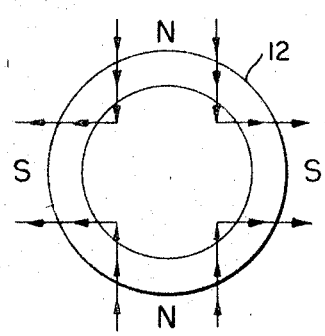
Figure 7:
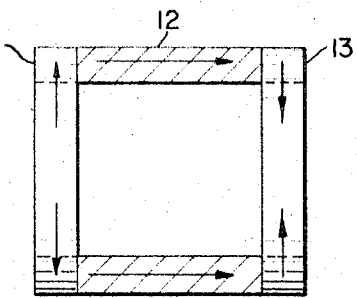
Figure 8:
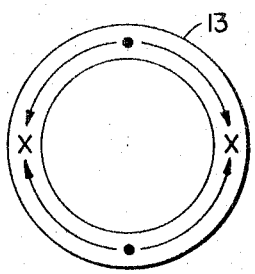

In the drawing:
FIG. 1 is an axial side view of a shaft-mounted rotor made in accordance with one embodiment of this invention;
FIG. 2 is an end view of this rotor and shaft assembly;
FIG. 3 is a schematic end view on a reduced scale of a motor incorporating this rotor and shaft assembly;
FIG. 4 is an axial side view on the same scale as FIG. 1 of a modified rotor and shaft assembly;
FIG. 5 is an end view of this modified assembly;
FIG. 6 is a schematic illustration of the flux paths which are developed in a four pole torque motor of the type illustrated in FIG. 3; and
FIGS. 7 and 8 are schematic illustrations of the current flow in a rotor made in accordance with this invention.

Generally speaking, the objectives of this invention are accomplished by employing a novel rotor which comprises a sintered iron and sintered copper alloy rotor core and a pair of sintered copper end rings, for the core. The sintered iron and copper core, in effect, provides an infinite number of conductors in the rotor; and the end rings short circuit the infinite number of conductors, thereby lowering the rotor resistance. The end rings may be compressed to the center iron-copper portion and sintered in one operation. The rotor core will provide induction acceleration and starting torque; and by making the core hollow with a relatively large diameter bore, the inertia of the rotor core is reduced to a minimum. The inertia may be further reduced by using a light-weight mounting such as an aluminum spider or bushing in the bore of the rotor for mounting it on the shaft of the motor. Using a sintered iron and sintered copper rotor the starting flux penetrates through the sintered iron, inducing a secondary current, said current conducts axially through the rotor via the sintered copper. Because there are no electrical restrictions the current will conduct as a current sheet across the pole surfaces of the rotor, hence eliminating cogging during the starting movements. Since the starting flux does not penetrate too deeply, the sintered iron and sintered copper rotor may consist of a thin shell design keeping the inertia of the rotor to a minimum.

To further increase efficiency of the rotor or core, a thin coating of copper may be applied, either by plating sintering or impregnation, to the outer peripheral surface of the rotor.

Referring now to the drawing by numerals of reference, the rotor 11 comprises a sintered annulus or core 12 made preferably of an iron copper powder mix, and a pair of end rings 13 made of pure copper powder. The hollow cylinder 12 may be mounted by spiders 14 on a shaft 15. The core 12 is a sintered blend of powdered ferromagnetic particles, and of electrically-conductive, substantially non-magnetic metal particles such as copper. For example, a blend of 75% iron particles and 25% copper particles may be used, although the copper content can be varied considerably and still do a good job. Preferably the end rings 13 are compressed onto the annulus 12 and sintered in one operation, thereby assuring that the end rings will be disposed in electrically conductive contact with opposite ends of the core 12. Alternatively, rings 13 may be soldered or brazed to opposite ends of the core 12.

As an alternative to sintering the cylinder 12 from a blend of iron and copper particles, it may be sintered first from iron particles, and thereafter impregnated with copper.

When the rotor 11 is mounted in a shaded-pole induction motor 20 of the type illustrated in FIG. 3, the flux from the four stator poles 18 penetrates through the sintered rotor in the manner illustrated by the arrows in FIG. 6, and induces therein secondary currents which are conducted axially of and around the core via the sintered, copper end rings 13 as illustrated schematically by the arrows in FIGS. 7 and 8. Since there are no actual rotor bars in rotor 11, but in effect an infinite number of conductors, it has much smoother rotation particularly during starting of the motor. It virtually eliminates cogging.

For certain applications, it has been found that the performance of the motor 20 can be improved by coating the whole outside peripheral surface of the rotor with copper or another electrically-conductive non-magnetic metal as by plating, or by sintering the coating on as at 22 (FIG. 4).

To mount this rotor on the motor shaft 15, a bushing 24 of light weight material, such as aluminum, is pressed into the rotor core. This bushing is bored to receive slidingly the rotor shaft.

From the foregoing it will be apparent that applicants have devised a relatively simple, efficient and economical rotor for motors of the type described. Since the starting flux (FIG. 6) of a motor of the type described does not, ordinarily, penetrate too deeply the surface of core 12, it is possible to reduce the overall cross sectional area of the core (for example by increasing its internal diameter) as compared to prior cores, but without resulting in any material loss in the magnitude of the secondary currents generated on the core. As a result, the sintered portions 12 and 13 of the rotor 11 are relatively light as compared to prior rotors; and the inertia of rotor 11, and hence the corresponding temperature rise and starting current for the motor in which it is used, are substantially reduced.

However while we have here illustrated and described as an embodiment of our invention a motor in which the stator has four poles, each of said poles comprising one main coil and one shading coil, and in which the rotor is made of 25% copper, 75% iron as a sintered iron alloy, and has two 100% sintered copper end rings, we do not wish to be limited in these respects. In practice the number of pairs of poles in the stator may be varied; and the percent of copper and iron alloy in the rotor core, and the percent of copper in the end rings may be varied. The non-magnetic material may be copper, aluminum, bronze, brass, an electrically conductive plastic and like materials; and the type of iron may be varied from pure iron to magnetic iron. Moreover, although we have herein illustrated and described our invention as related to a shaded pole type motor, it will be understood that certain phases of our invention may be found applicable to electric dynamo-machines in general. In its immediate commercial aspect our invention is particularly suitable for a four pole induction motor of the single phase shaded-pole self-starting torque type in which the stator core is built up of counterpart steel laminations.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims,

Having thus described our invention, what we claim is:
1. A rotor for a dynamoelectric machine, comprising:
a hollow, cylindrical sintered, electrically conductive core which is an alloy of magnetic and non-magnetic materials,
a pair of electrically-conductive metallic rings secured in electrically-conductive contact with opposite ends, respectively, of said core coaxially thereof,
the quantity of said magnetic material in said core exceeding the non-magnetic material therein,
said core comprising 25% copper and 75% iron, and
said rings being made of pure copper powder compressed and sintered to said core.
2. A rotor for a dynamoelectric machine, comprising
a sintered, electrically-conductive annular member containing both magnetic and non-magnetic materials,
a pair of electrically-conductive metallic rings secured in electrically-conductive contact with opposite ends, respectively, of said member coaxially thereof, and
means in the bores of said member and of said rings for mounting said member on the shaft of a dynamoelectric machine,
the quantity of said magnetic material in said member exceeding the non-magnetic material therein,
said non-magnetic material being copper particles concentrated in greater quantity adjacent the outer peripheral surface of the member to define an infinite number of conductors for conducting current axially of said member, and
said rings being made of pure copper powder compressed and sintered to said member, and
said rings being operative to short circuit said conductors at opposite ends, respectively, of said member.
3. A rotor for a dynamoelectric machine, comprising
a sintered, electrically-conductive member containing both magnetic and non-magnetic materials, and
a pair of electrically-conductive metallic rings secured in electrically-conductive contact with opposite ends, respectively, of said member coaxially thereof, and
said member and rings having a relatively large bore diameter and being mounted on a shaft by a lightweight material pressed into the bore and slidably receiving said shaft.

References Cited
UNITED STATES PATENTS

| | | | |
|---|---|---|---|
| 1,607,287 | 11/1926 | Laffoon | 310—261 X |
| 2,125,970 | 8/1938 | Waters | 29—598 |
| 2,193,435 | 3/1940 | Smith | 75—200 |
| 2,387,073 | 10/1945 | Horlacher | 310—211 |
| 3,163,788 | 12/1964 | Powers | 310—45 |
| 2,721,278 | 10/1955 | Baumann et al. | 310—44 |

FOREIGN PATENTS 1,060,357  11/1953  France.

WARREN E. RAY, Primary Examiner

U.S. Cl. X.R.

310—45, 197, 211, 266